(12) United States Patent
Cross et al.

(10) Patent No.: US 7,007,955 B2
(45) Date of Patent: *Mar. 7, 2006

(54) DRYER SEAL

(75) Inventors: William Cross, Anderson, SC (US); David Starrett, Greer, SC (US)

(73) Assignee: The Felters Group, Roebuck, SC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/865,212

(22) Filed: Jun. 10, 2004

(65) Prior Publication Data

US 2005/0017459 A1    Jan. 27, 2005

Related U.S. Application Data

(60) Provisional application No. 60/490,361, filed on Jul. 25, 2003.

(51) Int. Cl.
*F16J 15/10*    (2006.01)
*F26B 25/00*    (2006.01)

(52) U.S. Cl. ............ 277/652; 277/654; 277/903; 34/601; 34/242

(58) Field of Classification Search ........... 277/652, 277/654, 903; 34/601, 242
See application file for complete search history.

(56) References Cited

U.S. PATENT DOCUMENTS

| | | | |
|---|---|---|---|
| 1,683,941 A * | 9/1928 | Wirfs | 277/652 |
| 2,050,050 A * | 8/1936 | Flora | 277/637 |
| 3,020,185 A * | 2/1962 | Moffitt, Jr. et al. | 428/365 |
| 3,086,216 A * | 4/1963 | Brooks et al. | 428/102 |
| 3,436,838 A | 4/1969 | Helfrich | 340/45 |
| 3,570,138 A | 3/1971 | Douglas et al. | 34/133 |
| 3,637,224 A | 1/1972 | Triplett et al. | 277/229 |
| 3,816,942 A | 6/1974 | Smith | 34/242 |
| 3,828,445 A | 8/1974 | Smoot | 34/242 |
| 3,875,686 A | 4/1975 | Smoot | 34/242 |
| 4,156,533 A * | 5/1979 | Close et al. | 277/652 |
| 4,669,200 A | 6/1987 | Carr | 34/242 |
| 5,127,169 A | 7/1992 | Ellingson | 34/601 |
| 5,156,360 A * | 10/1992 | Shine | 244/129.1 |
| 5,363,569 A | 11/1994 | Kadakia | 34/601 |
| 5,509,669 A * | 4/1996 | Wolfe et al. | 277/654 |
| 5,548,908 A | 8/1996 | Torborg et al. | 34/601 |
| 6,675,496 B1 * | 1/2004 | Moon et al. | 34/601 |

* cited by examiner

*Primary Examiner*—Alison K. Pickard
(74) *Attorney, Agent, or Firm*—J. M. Robertson Intellectual Prop, LLC

(57) ABSTRACT

A dryer seal. The seal is formed from an elongate multi-layer structure having a strip of fibrous material folded upon itself to establish a folded perimeter edge and a pair of outwardly projecting portions projecting away from the folded perimeter edge. A fibrous interior spacer layer is located between the outwardly projecting portions and a single attachment seam extends at an inboard location substantially parallel to said folded perimeter edge.

14 Claims, 3 Drawing Sheets

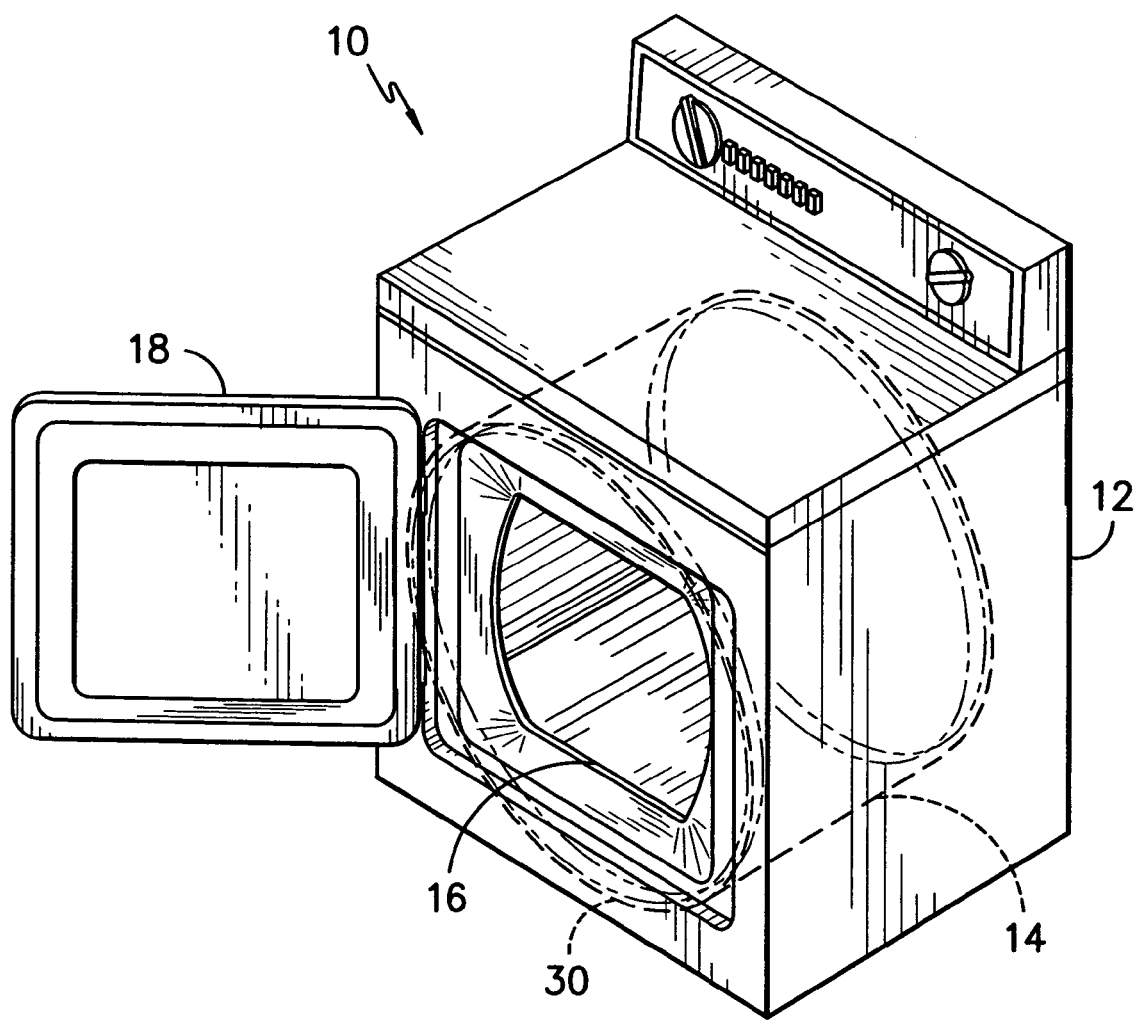
FIG. -1-

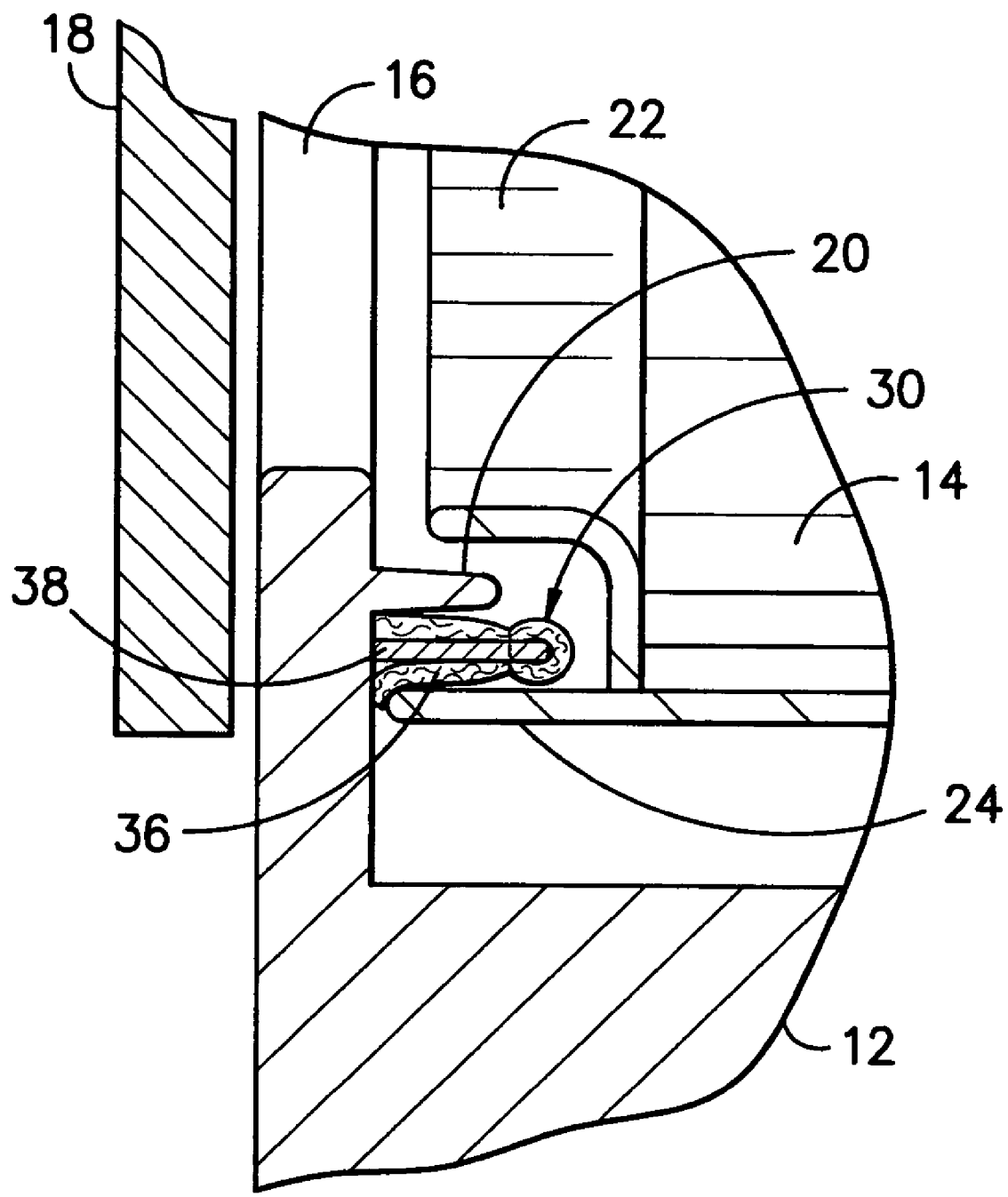
FIG. -1A-

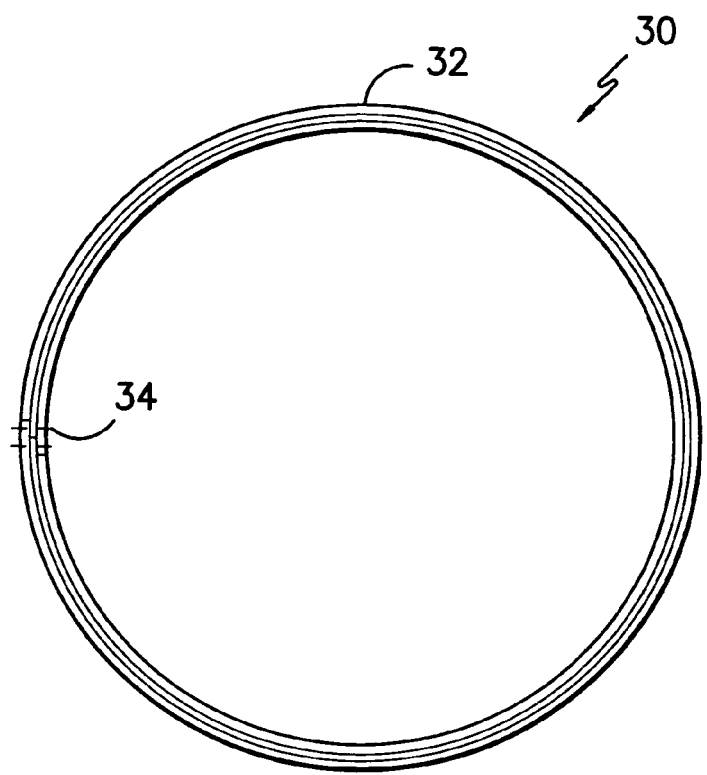
*FIG. -2-*
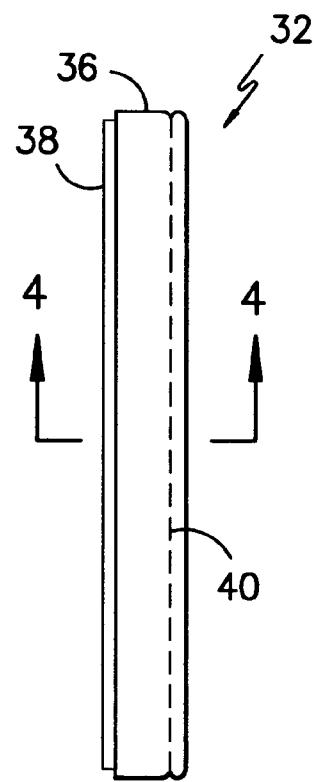
*FIG. -3-*
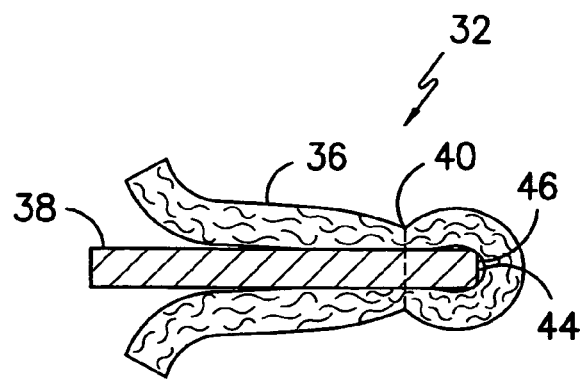
*FIG. -4-*

DRYER SEAL

CROSS-REFERENCE TO RELATED APPLICATIONS

This application claims the benefit of and priority from provisional application 60/490,361 filed Jul. 25, 2003 the contents of which are hereby incorporated by reference in their entirety.

TECHNICAL FIELD

This invention relates to a dryer seal and more particularly to a dryer seal of simplified construction incorporating an arrangement of fibrous material forming a multi-layer sealing element secured together by a simplified stitching arrangement.

BACKGROUND OF THE INVENTION

Automatic clothes dryers typically include a housing (also known as a bulkhead) and a rotating drum supported within the housing. It is known to use seal elements in the form of rings of felt which may be disposed between the housing and the drum so as to bear against the drum as it rotates. The use of a sealing element is desirable to prevent air leakage between the drum and the clothes dryer cabinet which could detrimentally affect the air flow system of the dryer. It is known to utilize seals in the form of multi-layered ring structures incorporating a folded over exterior layer such as wool or wool blend nonwoven material with a spacer material such as polyester or polyester blend material held within the folded over exterior. The legs projecting outwardly from the folded edge form a sealing contacting relation with the rotating drum. In known past constructions of this type the spacer material was typically held in place by two seams with a first positioning seam running between the upper edge of the spacer material and one side of the folded over exterior and a second holding seam extending at an inboard position through all three layers so as to establish a coordinated stable structure.

In the past the use of a first positioning seam and a second holding seam was believed to be necessary to maintain the desired spatial relation between the folded over exterior and the internal spacer material. Maintenance of this spatial relationship is required in order to retain the desired thickness of material between the drum and the housing. In the event that the internal spacer becomes disengaged from or unduly skewed relative to the folded over exterior, the seal efficiency may be greatly reduced thereby permitting hot air to exit the dryer drum and travel into the cabinet.

SUMMARY OF THE INVENTION

This invention provides advantages and alternatives over the prior art by providing a dryer seal of substantially simplified construction which eliminates the need for double stitching while nonetheless providing desirable sealing characteristics. In particular the present invention provides a seal which functions in the desired manner of prior seals by using flared edges to maintain a sealing relation between a rotating dryer drum and the dryer cabinet. However, although the seal of the present invention operates in the same manner as known prior seals, it utilizes only a single connecting stitch line such as a lock or chain stitch between the folded over exterior and the internal spacer.

BRIEF DESCRIPTION OF THE DRAWINGS

The following drawings which are incorporated in and which constitute a part of this specification illustrate an exemplary embodiment of the present invention and, together with the general description above and the detailed description set forth below, serve to explain the principles of the invention wherein:

FIG. 1 is a perspective view of an exemplary clothes dryer with the rotating drum and seal illustrated in phantom;

FIG. 1A is an exploded cut-away view of a seal according to the present invention with the seal mounted around a bulkhead flange;

FIG. 2 is an end view of a dryer seal according to the present invention;

FIG. 3 is an elevation plan view of an elongate strip of multi-layered construction which may be attached end to end to form the dryer seal illustrated in FIG. 2; and FIG. 4 is a view taken generally through line 4—4 in FIG. 3 illustrating the arrangement of layers and single stitch line.

While the invention has been generally described above and will hereinafter be described in connection with certain potentially preferred embodiments and procedures, it is to be understood and appreciated that in no event is the invention to be limited to such illustrated and described embodiments and procedures. On the contrary, it is intended that the present invention shall extend to all alternatives and modifications as may embrace the broad principles of this invention within the true spirit and scope thereof.

DESCRIPTION

Reference will now be made to the various drawings wherein to the extent possible like reference numerals are utilized to designate corresponding components throughout the various views. In FIGS. 1 and 1A, there is illustrated a dryer 10 including a cabinet body 12 housing a heated rotating drum 14. As illustrated, the cabinet body includes a door opening 16 for loading clothing articles into the mouth of the drum 14. The door opening 16 may be closed by means of a door 18.

As will be well known to those of skill in the art, the cabinet body 12 typically includes a bulkhead flange 20 (FIG. 1A) surrounding the door opening and projecting into the interior of the cabinet body. The bulkhead flange 20 is disposed generally around a reduced diameter drum opening 22. An outer wall portion 24 of the drum is disposed in surrounding relation to the flange or ring 20.

As shown, a seal 30 is disposed around the bulkhead flange 20 between the outer wall portion 24 and the bulkhead flange 20. As will be appreciated by those of skill in the art, dryers are typically vacuum systems. In operation the seal 30 prevents the draw of cool (non-heated) air from around the drum. With this flow path blocked, air is drawn more efficiently into the drum from a heated element area for use and eventual vent discharge.

As will be described in greater detail hereinafter, the seal 30 includes a folded over exterior 36 and an internal fibrous spacer 38. As the dryer is operated the drum 14 may experience a degree of oscillation up and down. The exterior 36 and spacer 38 define legs which may flair out or compress as required to adjust for this up and down oscillation and thereby maintain contacting sealing relation with the moving drum.

Although dryer seal arrangements using seals having flared ends were previously known, according to the present invention an improved construction for the seal 30 is provided which eliminates the need for multiple seams holding the spacer material in place. Thus, substantial efficiency is provided without sacrificing the ability to hold the spacer material in place (thereby avoiding dislocation or skewing) or giving up the ability to maintain contacting relation between the seal 30 and the oscillating drum 14.

Referring to FIGS. 2–4, it may be seen that the dryer seal 30 is preferably of substantially circular construction. According to one potentially preferred practice the dryer seal 30 is formed by adjoining the opposing ends of an elongate sealing structure 32 by use of end to end stitching 34 or other attachment means such as ultrasonic welding and the like as may be known to those of skill in the art.

Referring simultaneously to FIGS. 2 and 3, according to one contemplated embodiment the sealing structure 32 is formed by folding an outer layer 36 around an interior spacer layer 38 and applying a single stitch line 40 through the layered structure so formed thereby securing the components in place relative to one another. As illustrated, the stitch line 40 is disposed at an inboard location relative to the folded over edge of the outer layer 36. Such an arrangement thereby forms a single bulbous pocket structure 44 in which a proximal end 46 of the interior spacing layer 38 is held.

According to an exemplary formation practice, the outer layer 36 is a needle punched nonwoven textile material formed from entangled fibers of wool or wool blend material such as wool and polyester or other synthetic fiber. Recycled grey wool material may be particularly desirable. In such a construction, the wool provides a degree of natural lubricity which may aid in avoiding premature damage. In one exemplary construction the outer layer 36 is a needle punched grey wool felt having a thickness of about 0.13 inches. However, it is likewise contemplated that other materials and/or constructions may be utilized if desired.

The interior spacer layer 38 is preferably a needle punched nonwoven of polyester. In one exemplary construction this interior spacer layer is needle punched polyester having a thickness of about 0.17 inches and a mass per unit area of about 12 ounces per square yard. However, it is likewise contemplated that other materials and/or constructions may be utilized if desired.

The stitch line 40 which defines the inboard boundary of the pocket 44 is preferably formed by a chain stitch or lock stitch construction although other stitching arrangements as may be known to those of skill in the art may likewise be utilized. In one exemplary construction the stitch line incorporates a stitch density of about 5 to about 13 stitches per inch. However, it is likewise contemplated that other stitching arrangements may be utilized if desired. The stitch joints formed preferably exceed the tear strength of the felt.

As previously indicated and illustrated in FIGS. 1A and 4, the portions of the outer layer 36 and interior spacer layer 38 which project outwardly from the pocket structure 44 define legs which can be compressed or flared as required to adjust for oscillation of the drum 14. Thus, contacting sealing relation between the seal and the drum is maintained during such oscillation.

While the present invention has been illustrated and described in relation to certain potentially preferred embodiments and practices, it is to be understood that such embodiments and practices are illustrative and exemplary only and that the present invention is in no event to be limited thereto. Rather, it is contemplated that modifications and variations to the present invention will no doubt occur to those of skill in the art upon reading the above description and/or through a practice of the invention. It is therefore contemplated and intended that the present invention shall extend to all such modifications and variations which incorporate the broad principles of the present invention within the full spirit and scope thereof.

What is claimed is:

1. A dryer seal comprising an elongate multi-layer structure wherein said elongate multi-layer structure comprises a strip of fibrous material folded upon itself to establish a folded perimeter edge and a pair of outwardly projecting portions projecting away from said folded perimeter edge and a fibrous interior spacer layer disposed between the outwardly projecting portions and wherein a single attachment seam extends at an inboard location substantially parallel to said folded perimeter edge so as to adjoin said outwardly projecting portions to said interior spacer layer at a defined location inboard of said folded perimeter edge, said outwardly projecting portions defining legs extending away from said folded perimeter edge in substantially parallel relation to one another in adjacent relation to opposite sides of the fibrous interior spacer layer, said legs terminating at distal ends remote from the attachment seam, wherein said distal ends are adapted to flare outwardly away from the fibrous interior spacer layer, said legs comprising intermediate segments disposed between the attachment seam and the distal ends, said intermediate segments adapted to maintain contact with at least a portion of the fibrous interior spacer layer when said distal ends flare outwardly away from the fibrous interior spacer layer.

2. The invention as recited in claim 1, wherein said single attachment seam comprises a chain stitch seam construction.

3. The invention as recited in claim 1, wherein said single attachment seam comprises a lock stitch seam construction.

4. The invention as recited in claim 1, wherein the fibrous material folded upon itself comprises a non-woven textile material comprising a plurality of entangled wool fibers.

5. The invention as recited in claim 1, wherein the fibrous material folded upon itself comprises a non-woven textile material comprising a plurality of wool fibers entangled with synthetic fibers.

6. The invention as recited in claim 5, wherein said synthetic fibers are polyester.

7. The invention as recited in claim 5, wherein the wool fibers are recycled grey wool.

8. The invention as recited in claim 1, wherein fibrous interior spacer layer comprises needle punched non-woven polyester.

9. The invention as recited in claim 8, wherein the interior spacer layer is characterized by a mass per unit area of about 12 ounces per square yard.

10. A dryer seat comprising an elongate multi-layer structure wherein said elongate multi-layer structure comprises a strip of fibrous material formed at least partially from a plurality of entangled wool fibers wherein said strip of fibrous material a folded upon itself to establish a folded perimeter edge and a pair of outwardly projecting portions projecting away from said folded perimeter edge; and a fibrous interior spacer layer of needle punched polyester disposed between the outwardly projecting portions and wherein a single attachment seam of chain stitch or lock stitch seam construction extends at an inboard location substantially parallel to said folded perimeter edge so as to form a single bulbous pocket holding a proximal edge of the fibrous interior spacer layer and adjoining said outwardly projecting portions to said interior spacer layer at a defined location inboard of said folded perimeter edge, said outwardly projecting portions defining legs extending away from said folded perimeter edge in substantially parallel relation to one another in adjacent relation to opposite sides of the fibrous interior spacer layer, said legs terminating at distal ends remote from the attachment seam, wherein said distal ends are adapted to flare outwardly away from the fibrous interior spacer layer, said legs comprising intermediate segments disposed between the attachment seam and the distal ends, said intermediate segments adapted to maintain contact with at least a portion of the fibrous interior spacer layer when said distal ends flare outwardly away from the fibrous interior spacer layer.

11. The invention as recited in claim 10, wherein the strip of fibrous material formed at least partially from a plurality of entangled wool fibers further comprises a plurality of synthetic fibers.

12. The invention as recited in claim 11, wherein said synthetic fibers are polyester.

13. The invention as recited in claim 11, wherein the wool fibers are recycled grey wool.

14. The invention as recited in claim 10, wherein the interior spacer layer is characterized by a mass per unit area of about 12 ounces per square yard.

* * * * *